Figure 1:
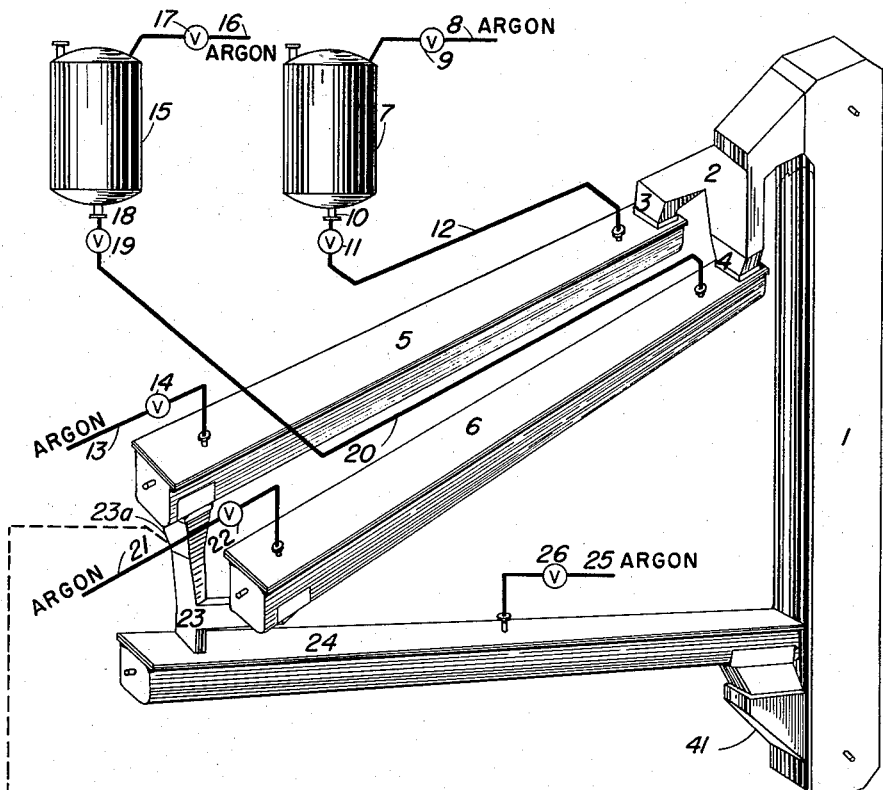

Oct. 27, 1959   W. C. MULLER   2,910,357
METHOD OF REDUCING METAL HALIDES
Filed Feb. 9, 1956

WERNER C. MULLER
INVENTOR.

BY Mitchell J. Condos

United States Patent Office 2,910,357
Patented Oct. 27, 1959

2,910,357

METHOD OF REDUCING METAL HALIDES

Werner C. Muller, Roslyn, N.Y., assignor to National Distillers and Chemical Corporation, a corporation of Virginia Application February 9, 1956, Serial No. 564,565

13 Claims. (Cl. 75—84.5)

The present invention relates to an improved process for the controlled reduction of halides of certain multi-valent metals and non-metals and, more specifically, to a novel and improved process for controlled reduction of chlorides of suitable multi-valent metals and non-metals of higher valent state for production of the metal and non-metal components thereof.

In certain processes for production of metals by reduction of salts thereof, and which may be illustrated by reduction of titanium tetrachloride for production of titanium sponge, the process is carried out in a batch-wise operation with use of a metal such as magnesium as the reducing agent. In such a process, the reduction step and the sponge growth step are carried out simultaneously in the same vessel and at relatively high temperatures, e.g., above 600° C. up to and including the fusion temperature of sodium chloride. Such a method of operation generally results in formation of hot spots in the reaction mixture as localized temperatures are obtained which are higher than the average temperature (e.g., 700–800° C.) of the reaction mixture. In large scale operations, it is not unusual for localized temperatures to occur that are as high as the melting point of titanium metal itself as fused particles of titanium sponge are commonly found in the final product. Under such severe operating conditions, by-product salts and even incompletely reduced sub-chlorides of titanium become so completely surrounded or encased in dense and massive sponge that aqueous leaching operations are difficult or impractical whereby volatilization of the residual by-product salt from the titanium sponge is oftentimes resorted to. Although drainage operations may be used to remove the bulk of the salt by-product while it is still molten, the drained sponge still contains substantial portions of residual salts which must be leached out or removed by suitable means such as distillation. Besides yielding a titanium sponge product which is difficult to purify, the simultaneous operation of the reduction and sponge growth phase of the described process results in formation of a type of sponge that adheres to the sides and bottoms of the reaction vessel employed. Such an adherent sponge is difficult to remove whereby resort is often made to machining operations, such as by means of a lathe, to remove the adherent sponge.

Objectionable features of a process as aforedescribed are obviated or substantially obviated by recently developed and improved sodium reduction processes wherein the two steps of reduction and sponge growth are separated, thereby permitting each step to be carried out in a more efficient manner and under more controlled conditions. In such improved processes, the first or chemical reduction reaction step is carried out, preferably in continuous manner, at a relatively low temperature such as from about 150 to about 600° C. The reduction step may be carried out in any of several ways and, in one method, sodium and the halide of a multi-valent component to be reduced are introduced simultaneously into a stirred reactor, preferably containing a mass of a pre-formed mixture of finely divided solid product of the reaction, in substantially stoichiometric amounts for the complete sodium reduction of the halides to the multi-valent component. As illustrated by the reduction of titanium tetrachloride, the product of reaction that forms from such a stoichiometric reaction may be continuously or semi-continuously withdrawn from the reduction vessel as a reduction step product consisting of a finely divided solid mass substantially containing the theoretical percentage of titanium metal mixed with salt, i.e., titanium:sodium chloride (17 weight percent titanium). Such a reduction step can be carried out at a temperature of from about 150 to about 600° C. or higher as long as a finely divided reaction mixture is produced that can be handled easily by mechanical means and agitated with conventional mixing apparatus. The finely divided solid mixture thus obtained may be cooled or stored or it may immediately be transported by suitable means such as a screw conveyor to a sintering or heat treating vessel wherein the sponge growth phase is carried out. The sponge growth phase commences almost immediately upon substantial melting of the by-product sodium halide and proceeds as long as the mass remains molten. In the sintering operation, the titanium-salt mixture agglomerates in the form of fine particles which become matted together as a sponge, the filaments of which are generally round in cross section, of relatively smooth surfaces and having the appearance of titanium which has been melted and solidified even though the sponge formation occurs at a temperature of 800–1150° C., i.e., almost 1000° below the melting point of titanium.

As illustrated by the reaction that occurs between sodium and titanium tetrachloride for its complete reduction to titanium metal, the reaction is violent and highly exothermic with a heat release of about 7500 B.t.u. per pound of titanium formed and, for each step of such a reduction, the heat evolved is as follows:

First Cl removed from $TiCl_4$=2960 B.t.u.
Second Cl removed from $TiCl_4$=1875 B.t.u.
Third and fourth Cl (average)=1380 B.t.u.

When the described stoichiometric sodium reduction process is carried out on a small scale with simultaneous addition of the reactants (e.g., sodium and titanium tetrachloride) to a pre-formed mixture of a finely divided solid product of the reduction reaction, the radiation area available in conventional types of stirred reactors is normally adequate to dissipate the heat of reaction even though it is highly exothermic. However, when such a process is carried out on a large scale, the radiation areas of reactors that are normally required are generally inadequate whereby localized temperatures occur that make it difficult to exercise adequate temperature control in the reduction operation and objectionable fusion of particles tends to occur in the reduction reaction mixture. Occurrence of such fusion is objectionable in that it increases power requirements for agitation of the reaction mixture and deleteriously affects the sintering operation by formation of granular particles.

It is the primary purpose of this invention to provide a method for controlled reduction of halides of certain multi-valent metals and non-metals in a manner, preferably continuous, whereby the reduction reaction is carried out with improved control of temperature thereby minimizing or obviating occurrence of objectionable fusion of particles in the reduction reaction mixture and processing difficulties resulting therefrom. It is another object of the invention to provide a process for reduction of certain halides of multi-valent metals and non-metals whereby the highly exothermic reduction reactions are carried out with improved control of heat released from such reactions. Still another object is the production of a suitable multi-valent metal or non-metal in improved sponge form by a process wherein a chloride of a suitable multi-valent metal or non-metal is subjected to an improved reduction and sintering treatment. Still other objects and advantages that result from the present invention will be apparent from the more detailed description thereof set forth hereinafter.

The process embodied herein is applicable to treatment of halides of multi-valent metals and multi-valent non-metals of higher valency state and reducible to at least one halide of said metal or non-metal of lower valency state, said halides of multi-valent metals and non-metals of higher valency being characterized by being reducible to an intermediate state of reduction by the corresponding metal or non-metal, and the resulting halides of intermediate state of reduction being further reducible by sodium. Thus, embodied for treatment herein are suitable halides of materials such as titanium, zirconium, molybdenum, tellurium, iron, and, more particularly, such multi-valent materials in the form of suitable chlorides, iodides, fluorides, etc. Although it is not intended that the invention be limited thereto, particularly embodied for use herein are materials such as titanium tetrachloride, zirconium tetrachloride, tellurium tetrachloride, chromium trichloride, chromium tetrachloride, molybdenum pentachloride, cupric chloride, hafnium tetrachloride, uranium pentachloride, and the like. Of such materials, halides of metals such as titanium and zirconium are particularly adapted for practice of this invention and, hence, for purposes of illustration and not limitation, the invention with respect to specific embodiments is described hereinafter with emphasis on the treatment of titanium tetrachloride.

The invention embodied herein relates generally to a method wherein reduction of a halide of a multi-valent metal or non-metal of a higher valent state is effected by admixing, under conditions to effect sodium reduction of a sub-halide of said metal or non-metal, (1) a substantially free-flowing finely divided mass of solid particles, non-reactive with sodium, coated with sodium, with (2) a free-flowing finely divided solid mass comprising particles of a sodium halide and a corresponding halide of the multi-valent metal or non-metal of an intermediate state of reduction, said latter mass having been formed by adding a corresponding halide of said metal or non-metal of a higher valency state to a finely divided mass of solids comprising particles of a corresponding halide of sodium and particles of the corresponding metal or non-metal per se whereby said added halide of the multi-valent component of higher valency state is reduced by the particles of the metal or non-metal per se to a halide of said metal or non-metal of an intermediate state of valency. Upon such admixture, the aforesaid separate masses of finely divided solids, one of which contains the sodium coated particles and the other of which contains the halide or halides of the multi-valent component of an intermediate state of reduction, are subjected to reaction between the sodium in highly dispersed form and the halide or halides of the multi-valent component of intermediate valency state. Thus, depending upon the amount of sodium employed relative to the amount of halides of the multi-valent component of intermediate valency state present in the admixture, the process can be carried out in a manner to produce a finely divided solid reduction product comprised substantially of a sodium halide and the multi-valent component per se, which product would result upon use of sodium in an amount stoichiometrically required to completely reduce the sub-halides; or, if desired, the amount of sodium used in preparing the sodium coated particle mixture may be less than the stoichiometric amount of sodium required for complete reduction of the sub-halides in the other mass whereby there is produced a reduction product comprised substantially of a sodium halide, the multi-valent component per se, and a sub-halide or sub-halides of said multi-valent component.

In carrying out the described process, the step of preparing the finely divided mass containing the halide or halides of the multi-valent component is carried out at a temperature sufficient for the multi-valent component present in the finely divided mass to which the halide of said component of high valency state is added to reduce the latter to an intermediate state of reduction but at a temperature below the melting point of the finely divided mass obtained as a product from such a step. Similarly, the sodium reduction step, i.e., the reduction step carried out upon admixing of the finely divided mass comprising the sodium coated particles and the finely divided mass containing the halide or halides of the multi-valent component of intermediate valency state, is carried out at a temperature below the melting point of the finely divided mass resulting from the sodium reduction step whereby a substantially free-flowing finely divided mass is obtained.

In preparation of each of the separate masses which are admixed to effect the sodium reduction, it is preferred that the reactants to each mass be added in an amount less, in weight ratio, than the weight of the finely divided mass to which it is added. For example, with reference to preparation of the sodium-coated particle mass, and illustrated by addition of sodium to a finely divided mass of sodium chloride and titanium metal, the sodium is added in an amount up to about 20 weight percent of the finely divided mass. As to preparation of the finely divided mass containing the partially reduced halide of the multi-valent component, and again using for illustration purposes, the addition of titanium tetrachloride to a finely divided mass of titanium metal and sodium chloride (17% by weight titanium), the titanium tetrachloride is added in a ratio of one part by weight of titanium tetrachloride to at least one and one-half, and preferably more, parts of the finely divided mass.

By practice of the invention embodied herein, wherein the halide of the multi-valent component of higher valent state is initially partially reduced by finely divided particles of said component in a relatively large finely divided mass comprising the sodium halide, and the subsequent reduction of the partially reduced product by sodium dispersed as a coating on finely divided particles non-reactive with sodium, decided advantages are obtained in that the heat evolution in the overall reduction operation is divided among several separate zones whereby, along with heat absorption by the finely divided solid masses in which the reduction reactions are carried out, obtainment of temperatures sufficiently high as to induce objectionable fusion of particles in the reduction reaction mixtures is obviated throughout the entire reduction operation. Moreover, and by the described step-wise preparation of the separate masses which are admixed to effect the sodium reduction of the sub-halides, the process embodied herein is highly flexible to the extent that the separately prepared masses, prior to admixture to effect the sodium reduction reaction, may be subjected to adjustment to a desired temperature level, such as may be effected by use of extraneous cooling means, by allowing heat to dissipate from the individual masses, and the like. Additionally, and as is described more fully hereinafter, the process may be carried out with certain halides of multi-valent components of higher valency state in a manner whereby the reduction operation is carried out under conditions that provide the aforestated advantages while also providing a reduction product that can be subjected to an improved combined reduction-sintering treatment for production of products of improved characteristics.

The process embodied herein may be carried out in batch-wise, semi-continuous, or continuous manner. For example, in a batch-wise operation and with use of the process embodied herein for treatment of titanium tetrachloride, it may be carried out in the following manner. A finely divided solid mass of sodium chloride, or such a mass of sodium chloride in admixture with particles of titanium, is maintained under agitation and liquid sodium is added thereto in an amount sufficient to substantially coat the finely divided particles but less than sufficient to provide a pasty, non-free flowing mass. To another finely divided mass of solids comprising particles of sodium chloride and titanium, titanium tetrachloride is added in an amount, based on the amount of titanium in said mass, whereby the titanium tetrachloride is reduced to titanium sub-chlorides by the particles of titanium in said mass, thereby providing a finely divided solid mass comprising sodium chloride and titanium sub-chlorides. The resulting two separate masses are then admixed at a temperature (e.g., 200° C.) sufficient to induce reduction reaction between the sodium and the titanium sub-chlorides. In instances wherein it is desired to obtain as the end product of such a reduction process a finely divided mixture of sodium chloride and titanium, the amount of sodium utilized in preparation of the mass containing the sodium coated particles is correlated with the amount of titanium sub-chlorides present in the other mass so as to effect stoichiometric reduction of the sub-chlorides to titanium. In instances wherein it is desired to obtain a reduction product that, in addition to sodium chloride and titanium, also contains some titanium sub-chlorides, the amount of sodium utilized in preparing the mass of sodium coated particles is less than the amount required for stoichiometric reduction of all of the sub-chlorides to titanium.

In preferred aspect, however, the invention is carried out in continuous manner and, accordingly, reference is made to the accompanying drawings illustrating an apparatus assemblage suitable for continuous operation and in which the product of the reduction operation is utilized as a source of the separate masses to which the reactants are added prior to their admixture for carrying out the sodium reduction reaction. Here again, for purposes of illustration and not limitation, the apparatus assemblage of the accompanying drawings is described with reference to its use for reduction of titanium tetrachloride to produce titanium sponge and in which the process is carried out under conditions to provide, as the source of said masses and as feed material for the sintering operation, a stoichiometric mixture of sodium chloride and titanium (17% by weight titanium).

Referring to the drawings, and specifically to Figure 1, the finely divided mixture (e.g., titanium and sodium chloride) obtained as the end product of the multi-step reduction operation embodied herein, is passed from conveyor-mixer 24 through chute 41 into elevating device 1. A controlled amount of the product mixture is withdrawn via line 27 to be subjected to a sintering operation (as described hereinafter) and the remainder of the product mixture is recycled by elevating device 1 into chute 2 wherefrom the recycled mixture is divided into two controlled streams by dividers 3 and 4. The recycled mixture from chute 3 is passed into conveyor-mixer 5 and that from chute 4 into conveyor-reactor 6. Titanium tetrachloride (liquid or vapor) is fed from feed tank 7 via line 10, control valve 11 and line 12 into conveyor-mixer 5. For maintaining an inert atmosphere above the titanium tetrachloride supply, an inert gas (e.g., argon) is introduced via line 8 and valve 9 into supply tank 7. In conveyor-mixer 5, the added titanium tetrachloride is reduced by the finely divided titanium in the recycled mixture to titanium dichloride and/or titanium trichloride mixtures, the atmosphere within conveyor-mixer 5 being maintained inert by introduction of an inert gas (e.g., argon) through line 13 and valve 14. Liquid sodium is fed into conveyor-mixer 6 from feed tank 15, blanketed with an inert gas introduced by line 16 and valve 17, the introduction of sodium into conveyor-mixer 6 being via line 18, valve 19, and line 20.

The atmosphere in conveyor-mixer 6 is maintained inert by introducing an inert gas (e.g., argon) via line 21 and valve 22. The quantity of sodium introduced through line 20 is correlated, in accordance with this embodiment, so as to be in stoichiometric balance with the titanium tetrachloride introduced to mixing conveyor 5 via line 12. In conveyor-mixer 6, the added molten sodium is mixed with the recycled finely divided titanium-sodium chloride mixture (inert to sodium) whereby the particles in the recycled product mixture in conveyor-mixer 6 are coated with sodium to form high surface sodium on the particles of the recycled mixture. The titanium sub-halide-sodium chloride mixture (which may also contain titanium metal) from conveyor-mixer 5 is passed through hopper 23 and the sodium-titanium-sodium chloride mixture from conveyor-mixer 6 is also passed from conveyor-mixer 6 into hopper 23 whereby both mixtures are blended and introduced into conveyor-mixer 24, in which the blended mixture undergoes, while being thoroughly mixed, reaction between the highly reactive sodium coatings on the mass obtained from conveyor-mixer 6 and the titanium sub-halides in the mass from conveyor-reactor 5. The atmosphere in conveyor-mixer 24 is maintained inert by introduction of an inert gas (e.g., argon) via line 25 and valve 26. There is thus produced in conveyor-mixer 24 a finely divided solid mixture of titanium and sodium chloride as the product of the described multi-step reduction process. As aforesaid, a portion of the product that passes into elevating device 1 is withdrawn via line 27 and the remainder is recycled to the described continuous process.

Figure 2:
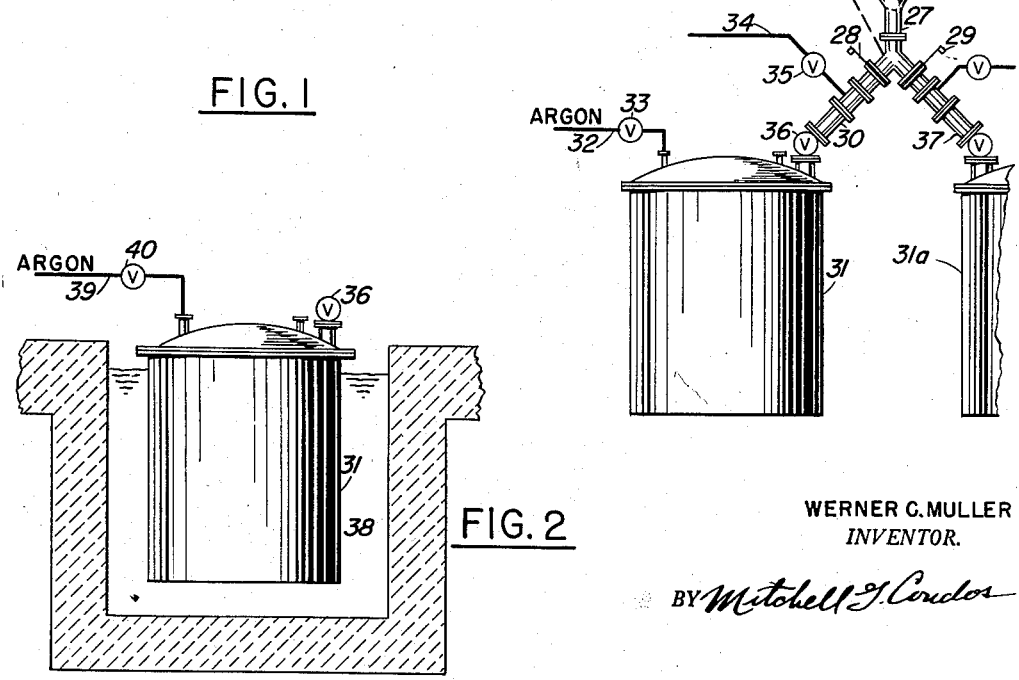

The portion of the reduction reaction mixture withdrawn from the system and passed through line 27 flows (when valve 29 is closed) through valve 28 and line 30 to sintering vessel 31 into which an inert gas (e.g., argon) is introduced via line 32 and valve 33 to maintain an inert atmosphere in vessel 31. Evacuation line 34, controlled by valve 35, is provided to remove reactive gases from line 30 when sintering vessel 31 is connected; that is, when vessel 31 is to receive the reduction reaction mixture from line 27, valve 28 is open and valve 29 is closed. When sintering vessel 31 is filled with reaction product, gate 29 is opened, gate 28 is closed and valve 36 is closed to permit the removal of sintering vessel 31 from the system without contamination with reactive gases and to provide for flow of reduction reaction mixture into duplicate sintering vessel 31a. The sintering vessel that has been filled with the reduction reaction mixture and disconnected from the system is then immersed, as shown in Figure 2, in a suitable heating medium 38 and heated (in instances wherein extraneous heat may be required) to a desired temperature. In instances wherein the multi-valent component (e.g., titanium) of the halide subjected to the reduction process is higher melting than the sodium halide by-product of said process, the contents of the sintering vessel are maintained at a temperature above the melting point of the sodium halide to assist in formation of the multi-valent component in massive form and, in the case of titanium, to assist in the growth of finely divided titanium particles to titanium sponge. In applications wherein the multi-valent component of the halide subjected to the reduction process is lower melting than the sodium halide by-product of the sodium reduction step, the contents of the sintering vessel may be subjected to a temperature above the melting point of the multi-valent component but below the melting point of the sodium halide and the multi-valent component in liquid form may be recovered therefrom by suitable means from the by-product salt. An inert gas, such as argon, is introduced into vessel 31 through line 39 and valve 40 to provide an inert atmosphere in vessel 31 during the sintering operation. When the reduction operation is carried out such that the mixture passed through line 27 contains sub-halides of the multi-valent component, the sintering is carried out in the presence of an amount of sodium sufficient to substantially complete the reduction of the sub-halides in the sintering vessel and, in such a case, the sodium may be provided by having the appropriate amount of sodium present in the bottom portion of the sintering vessel. For applications wherein the multi-valent component is higher melting than the by-product salt, and particularly for production of multi-valent components that form a sponge as in the case of titanium, the contents of the sintering vessel are subjected to an elevated temperature, such as to about 900° C. for a period of two to twenty hours with the longer periods of time within that range being normally employed for sintering of mixtures that are substantially devoid of halides of the multi-valent component subjected to the aforedescribed reduction treatment.

In carrying out the embodiment of the invention described with reference to the apparatus assemblage shown in the drawings, the rate of recycle of the product mixture via elevating device 1 is adjusted so that a relatively large mass of reaction product is circulated through conveyor-mixers 5, 6 and 24 to absorb the heat of the reduction reactions by an adibatic temperature rise without raising the temperature of the reaction product above a desired operating level. Preferably, elevating device is so designed that it has sufficient cooling surface to effect removal, from the recycled product before it reaches dividing device 2, of the heat evolved by the reduction reactions.

In a specific illustration for carrying out the process embodied herein in continuous manner with an apparatus assemblage as aforedescribed, twenty-one parts of reduction reaction product (Ti:NaCl containing 17% by weight titanium) at 400° C. is passed from conveyor-reactor 24 into the bottom portion of elevating device 1. One part of the product passed into device 1 is withdrawn via line 27 for sintering and the remaining twenty parts are elevated to chute 2 with the product being reduced in temperature to about 200° C. while passing through the elevating device. Of the twenty parts of recycled product, ten parts are passed into conveyor-mixer 5 and ten parts to conveyor-mixer 6. In conveyor-mixer 5, the finely divided solid product is contacted with titanium tetrachloride vapor, introduced via line 12, in an amount of one mol of titanium tetrachloride per ten mols of titanium metal in the finely divided mass whereby the titanium tetrachloride is reduced by the titanium in said mass in conveyor-mixer 5 to titanium sub-chlorides (mainly $TiCl_2$). The temperature of the mixture in conveyor-mixer 5 rises from about 200° C. to about 280° C. due to heat evolved by the reduction of the tetrachloride to sub-chlorides. Meanwhile, the finely divided mass passed into conveyor-mixer 6 is contacted with molten sodium (150° C.) introduced via line 20 in an amount of 4 mols of sodium per 10 mols of titanium. Since the sodium is added to a finely divided mass of particles (Ti+NaCl) non-reactive with sodium, the temperature of the mass in conveyor-mixer 6 remains below the temperature (200° C.) of the mass passed into conveyor-mixer 6. The blended mixture that enters conveyor-mixer 24 is, therefore, at a temperature not in excess of about 240° C. but the reaction between the sodium and sub-chlorides which reduce the latter to titanium raises the temperature of the mass in conveyor-mixer 24 to about 400° C. Thus, in such an embodiment, at no point in the entire step-wise reduction process is the heat of the reaction released at such a rate so as to require rapid cooling (which renders heat control difficult), and the entire operation is maintained at a temperature level far below that sufficient to induce objectionable fusion of particles in the reduction reaction mixture. Of the twenty-one parts of product passed from conveyor-mixer 24 to the bottom of elevating device 1, one part is passed through line 27 for sintering and twenty parts are recycled as aforedescribed.

In still another embodiment, the invention may be carried out in continuous manner with production, as the product to be subjected to sintering, of a finely divided mixture of titanium sub-chlorides and sodium chloride. For such an embodiment, an apparatus assemblage such as that shown in the drawings may be used except that the withdrawal of product from reduction system is made from a suitable outlet line provided in hopper portion 23a for passage of a controlled portion of material from conveyor-mixer 5 direct to the sintering vessel, in which case the bottom portion of elevating device 1 is sealed. For such an embodiment, the process is carried out under conditions to provide for passage, from conveyor-mixer 24 to the bottom portion of elevating device 1, a finely divided solid mixture comprised substantially of titanium and sodium chloride, for example, in a ratio of 11 mols of titanium and 44 mols of sodium chloride (i.e., Ti+4NaCl). The finely divided mixture is elevated via device 1 wherefrom it is apportioned by dividers 3 and 4 into (1) one portion of 10 mols of Ti and 40 mols of NaCl passed into conveyor-mixer 6, and (2) the remainder (one mol of titanium and 4 mols of NaCl) passed into conveyor-mixer 5. The finely divided mixture passed into conveyor-mixer 6 is contacted with 2 mols of sodium whereby the finely divided particles (non-reactive with sodium) are coated with sodium. The finely divided mixture passed into conveyor-mixer 5 is contacted with one mol of titanium tetrachloride vapor whereby the tetrachloride is reduced to $TiCl_2$, providing a finely divided mixture of $2TiCl_2+4NaCl$. Of that mixture, one-half is withdrawn from hopper portion 23a and passed to the sintering vessel and the other half is mixed with the product from conveyor-mixer 6 and whereby in conveyor-mixer 24, sodium reduction of the titanium dichloride is effected providing, for passage from mixer 24 to elevating device 1, a finely divided mixture of 11 mols of titanium and 44 mols of sodium chloride for recycling as aforedescribed. For such an embodiment, the mixture of sodium chloride and titanium dichloride withdrawn as the product of the reduction operation is subjected to contact, in the sintering vessel with an amount of sodium sufficient to reduce the titanium dichloride to titanium and the sintering is effected by maintaining the vessel contents at a temperature above the melting point of sodium chloride, and preferably at about 900° C., for about 2 to 10 hours to expedite growth of titanium sponge.

As is apparent from the foregoing description of the invention, it embodies the partial reduction of the halide of the multi-valent component of higher valency state by means of the particles of such a component (reducing agent) in mixture with the corresponding halide of sodium whereby the reduction reaction occurs with the reducing agent dispersed throughout a relatively larger volume of the finely divided mass in which the reduction is effected. Thus, the heat evolved by the partial reduction step is distributed throughout the mass and such heat is absorbed by said mass. Similarly, upon admixture of the resulting mass with the mass comprising the finely divided particles coated with sodium, to effect sodium reduction of the partially reduced product, the sodium and partially reduced product are also thoroughly dispersed throughout the blended product whereby the heat evolved from the reduction reaction in that step is also distributed throughout and absorbed by the blended mass. Hence, as compared to processes wherein a material such as titanium tetrachloride is reduced to titanium by sodium, and in which both reactants in stoichiometric amount are added simultaneously to a finely divided solid product of the reaction whereby there results a heat release of about 7500 B.t.u. per pound of titanium formed in a localized portion of the reaction mixture, practice of this invention not only apportions the total amount of the overall reduction reaction heat released over a plurality of separate zones but, moreover, in a manner whereby the heat released in each reduction step is effectively distributed throughout and absorbed by a substantial mass of finely divided solid particles. Thus, the reduction of the described halides of multi-valent components is effected with improved temperature control and obviation of disadvantages encountered with a process utilizing simultaneous addition of reactants in stoichiometric amounts for reduction of the multi-valent metal or non-metal to the component metal or non-metal.

In preferred embodiment, the invention is practiced in a manner whereby the product of the reduction operation comprises, in addition to the by-product sodium salt, a sub-halide of the multi-valent component. Thus, and illustrated in the processing of titanium tetrachloride, the process embodied herein is preferably carried out in a manner to produce a reduction product that, in addition to sodium chloride, contains sub-chlorides of titanium. For example, and as compared to processes for stoichiometric reaction between titanium tetrachloride and sodium for production of a reduction mixture of sodium chloride and titanium, the following advantages are obtained thereover when the reduction operation as embodied herein is carried out such that the reduction product contains sub-chlorides whereby the reduction is completed with sodium in the sintering vessel. Such advantages include (1) the sponge-growth phase is effected in less time and, of considerable importance in the case of titanium, a markedly higher amount of titanium in the sponge is present in the form of relatively large crystals and crystalline structures that possess improved ductility characteristics. Moreover, by carrying out the process without complete reduction of all of the multi-valent component halides prior to the sintering operation, correspondingly less heat evolution occurs in the initial reduction steps, and the heat released in completion of the reduction in the sintering operations provides a substantial amount of heat which is utilized for raising the mixture to sintering temperatures.

While there are above disclosed but a limited number of embodiments of the process of the invention herein presented, it is possible to produce still other embodiments without departing from the inventive concept herein disclosed, and it is desired therefore that only such limitations be imposed on the appended claims as are stated therein.

What is claimed is:

1. A process for reducing a higher halide of an element that can form more than one halide with a halogen, said higher halide being reducible to a lower halide by the corresponding element per se and the resulting lower halide being further reducible by sodium, which comprises (1) providing a first substantially free-flowing finely divided mass of solid particles, non-reactive with sodium, on which sodium is dispersed as a coating on said particles, (2) providing a second substantially free-flowing finely divided mass of solids comprising particles of a sodium halide and particles of a corresponding lower halide of said element, said second mass having been formed by adding a higher halide of said element to a finely divided mass of solids comprising particles of a corresponding halide of sodium and particles of the corresponding element per se whereby the added halide is reduced to a lower halide by said particles of the element per se, and (3) mixing said first and second finely divided masses to at least partially reduce said lower halides in said second mass by reduction reaction with the sodium dispersed in said first mass, said reduction step (3) being carried out at a temperature sufficient to effect said reduction but below the melting point of the product of step (3).

2. A process, as defined in claim 1, wherein the amount of dispersed sodium in said first mass is sufficient to substantially completely reduce the lower halide in said second mass.

3. A process, as defined in claim 1, wherein the amount of dispersed sodium in said first mass is less than the amount required to completely reduce the lower halide in said second mass to provide, as the product of said process, a finely divided mixture of solids comprising sodium halide, the element per se and lower halide of said element.

4. A process, as defined in claim 1, carried out in continuous manner by recycling a portion of the product from the sodium reduction step for use as the finely divided solid mass to which molten sodium is added while agitating said mass for preparation of said first mass, and recycling another portion of said product from the sodium reduction step for use as the finely divided solid mass for preparation of said second mass.

5. A continuous process, as defined in claim 4, wherein the portion of the product of the sodium reduction step recycled for preparation of said second mass is reduced in temperature prior to addition thereto of the higher halide of said element to be reduced to a corresponding lower halide of said element so as to form said second mass.

6. A process for reduction of a higher halide of an element that can form more than one halide with a halogen, said higher halide being reducible to a lower halide by the corresponding element per se and the resulting lower halide being further reducible by sodium which comprises (1) providing a first substantially free-flowing finely divided mass of solid particles coated with sodium, (2) providing a second substantially free-flowing mass of finely divided solids comprising sodium halide and a corresponding lower halide of said element, said second mass having been formed by adding a corresponding higher halide of said element to a finely divided mass of solids comprising a corresponding halide of sodium and particles of the corresponding element per se in an amount sufficient to reduce said added higher halide to a corresponding lower halide of said element, said reduction in formation of said second mass being carried out while the mass to which the higher halide is added is maintained under agitation and at a temperature sufficient to effect said reduction but below the melting point of said second mass, and (3) admixing said first and second mass to at least partially reduce the lower halides of said element in said second mass by the sodium dispersed as a coating on the particles of said first mass, said reduction step (3) upon admixing of said masses being carried out at a temperature below the melting point of the finely divided product of said reduction step (3).

7. A process, as defined in claim 6, wherein said first mass is prepared by adding molten sodium to a relatively larger amount of a finely divided solid mass comprising a sodium halide while the latter mass is maintained under agitation, and said second mass is prepared by adding the higher halide of said element to a relatively larger amount of a finely divided solid mass comprising sodium halide and particles of said element per se.

8. A process, as described in claim 6, wherein the heat of reaction evolved from the reduction step in preparation of said second mass is removed prior to admixing said second mass with said first mass to effect the sodium reduction step (3).

9. A process for reduction of a higher halide of titanium which comprises (1) providing a first finely divided solid mass comprising a sodium halide and a corresponding sub-halide of titanium prepared by adding a higher halide of titanium to a finely divided solid mass comprising a corresponding halide of sodium and titanium in an amount sufficient for the titanium to reduce the added higher halide to a sub-halide of titanium, said reduction being carried out by maintaining under agitation the mass to which said higher halide of titanium is added and at a temperature below the melting point of the product comprising said sub-halide of titanium, (2) providing a second finely divided mass comprising particles of sodium halide coated with sodium, the amount of sodium dispersed as a coating on particles of said second mass being correlated with the amount of sub-halides present in said first mass such that the amount of sodium in said second mass does not substantially exceed that stoichiometrically required to completely reduce the sub-halides in said first mass, and (3) mixing the first and second mass to reduce sub-halides in said first mass by the sodium dispersed in said second mass, said step (3) being carried out at a temperature sufficient to effect said reduction but below the melting point of the product of step (3).

10. A process for reducing titanium tetrachloride which comprises (1) providing a first finely divided solid mass comprising sodium chloride and titanium sub-chlorides by adding titanium tetrachloride to a finely divided solid mass comprising sodium chloride and titanium in an amount sufficient for the titanium to reduce the added titanium tetrachloride to a titanium sub-chloride, said reduction being carried out at a temperature below the melting point of the product comprising said titanium sub-chlorides, (2) providing a second finely divided mass by dispersing sodium as a coating on particles of a finely divided solid mass comprising sodium chloride, the amount of sodium dispersed in said mass being correlated with the amount of sub-chlorides present in said first mass such that the amount of dispersed sodium in said second mass does not exceed the amount stoichiometrically required to completely reduce the sub-chlorides in said first mass, and (3) mixing said first mass with said second mass to reduce sub-chlorides in said first mass by the dispersed sodium in said second mass, said step (3) being carried out at a temperature sufficient to effect such reduction but below the melting point of the product of step (3).

11. A process for reducing titanium tetrachloride which comprises (1) providing a first finely divided solid mass comprising sodium chloride and titanium sub-chlorides by adding titanium tetrachloride to a finely divided solid mass comprising sodium chloride and titanium in an amount sufficient to reduce the added titanium tetrachloride to titanium sub-chlorides, said reduction being carried out by maintaining under agitation the mass to which said tetrachloride is added and at a temperature below the melting point of the product comprising the sub-chlorides, (2) providing a second finely divided mass of solids comprising particles of sodium chloride coated with sodium by adding molten sodium to a finely divided mass comprising solid sodium chloride, said second mass having been formed by adding to an agitated finely divided mass comprising sodium chloride an amount of molten sodium that does not substantially exceed the stoichiometric amount required to completely reduce the sub-chlorides in said first mass to titanium, and (3) mixing the said first and second masses at a temperature sufficient for the sodium in said second mass to reduce sub-chlorides in said first mass, said sodium reduction step being carried out at a temperature sufficient to effect said reduction but below the melting point of the finely divided product of the sodium reduction step.

12. A process as defined in claim 11, wherein said first mass is admixed with said second mass containing an amount of sodium sufficient to substantially stoichiometrically reduce the sub-halides in the first mass to titanium to provide, as a product of the sodium reduction step, a finely divided solid mixture of sodium chloride and titanium, and said mixture of sodium chloride and titanium is subjected to an elevated temperature above the melting point of sodium chloride for a period of time sufficient to form titanium sponge.

13. A process, as defined in claim 11, wherein said first mass is admixed with said second mass containing an amount of sodium less than required to stoichiometrically reduce all of the sub-halides in the first mass to titanium thereby providing, as the product of the sodium reduction step, a finely divided mixture comprising sodium chloride and a titanium sub-chloride, and subjecting said latter mixture to contact with sodium in an amount substantially sufficient to reduce the sub-halides to titanium and maintaining the mixture at an elevated temperature above the melting point of sodium chloride for a period of time sufficient to form titanium sponge.

References Cited in the file of this patent

FOREIGN PATENTS

| | | |
|---|---|---|
| 686,845 | Great Britain | Feb. 4, 1953 |
| 694,921 | Great Britain | July 29, 1953 |
| 717,930 | Great Britain | Nov. 3, 1954 |